(12) United States Patent
Das et al.

(10) Patent No.: US 12,292,927 B1
(45) Date of Patent: May 6, 2025

(54) STORING CONTEXTUAL DATA WITH CONTEXT SCHEMAS

(71) Applicant: Twilio Inc., San Francisco, CA (US)

(72) Inventors: Ishita Das, Bangalore (IN); Sundaram Ravisundaram, Bangalore (IN)

(73) Assignee: Twilio Inc., San Fancisco, CA (US)

(*) Notice: Subject to any disclaimer, the term of this patent is extended or adjusted under 35 U.S.C. 154(b) by 0 days.

(21) Appl. No.: 18/401,162

(22) Filed: Dec. 29, 2023

(51) Int. Cl.
  *G06F 16/90* (2019.01)
  *G06F 16/901* (2019.01)
  *G06F 16/903* (2019.01)

(52) U.S. Cl.
  CPC ...... *G06F 16/901* (2019.01); *G06F 16/90335* (2019.01)

(58) Field of Classification Search
  CPC .................... G06F 16/901; G06F 16/90335
  See application file for complete search history.

(56) References Cited

U.S. PATENT DOCUMENTS

| | | | |
|---|---|---|---|
| 7,693,973 B2 | 4/2010 | Joseph et al. | |
| 9,286,399 B2 | 3/2016 | Pingree | |
| 11,573,963 B2 | 2/2023 | Frampton et al. | |
| 11,657,088 B1* | 5/2023 | Acheson | G06F 16/90335 707/741 |
| 2005/0120029 A1* | 6/2005 | Tomic | G06F 16/86 |
| 2008/0229241 A1* | 9/2008 | Davies | H04L 67/02 715/810 |
| 2009/0112916 A1* | 4/2009 | Stuhec | G06Q 10/10 707/999.102 |
| 2012/0066217 A1* | 3/2012 | Eder | G06F 16/951 707/723 |
| 2018/0373781 A1 | 12/2018 | Palrecha | |
| 2021/0248136 A1* | 8/2021 | Panuganty | G06F 16/972 |

FOREIGN PATENT DOCUMENTS

DE      102016005519 A1    11/2017

OTHER PUBLICATIONS

James Chalk, "SciData: A data model and ontology for semantic representation of scientific data", Oct. 2016, pp. 1-2, 5, 9-12, https://www.researchgate.netpublication/309162834_SciData_A_data_model_and_ontology_for_semantic_representation_of_scientific_data.

Hellerstein, "Ground: A Data Context Service", 2017, pp. 1, 3 and 7, https://rise.cs.berkeley.edu/wp-content/uploads/2017/03/CIDR17.pdf.

Elmongui ,"Chameleon: Context-Awareness inside DBMSs", Oct. 2008, pp. 3 and 10, https://citeseerx.ist.psu.edu/document?repid=rep1&type=pdf&doi=ed2ba0d66e3e98b8277a53beeda168ee57a1fb1e.

Quintarelli, "Information Systems: A principled approach to context schema evolution in a data management perspective.", 2015, pp. 1-37.

* cited by examiner

*Primary Examiner* — Merilyn P Nguyen
(74) *Attorney, Agent, or Firm* — Lowenstein Sandler LLP

(57) ABSTRACT

A context schema characterizing a context associated with an application is received by a processing device. The context schema specifies one or more context attributes. Each context attribute identifies a respective context element of the context associated with the application. A context item comprising one or more values is received. Each value corresponds to a respective context attribute of the one or more context attributes. The context item is validated against the context schema. Responsive to determining that the context item conforms to the context schema, the context item is stored in a context store.

20 Claims, 8 Drawing Sheets

500

516
↓

RECEIVE A SEARCH QUERY FROM THE APPLICATION COMPRISING AN IDENTIFIER OF A CONTEXT ATTRIBUTE AND A SEARCH VALUE OF THE RESPECTIVE CONTEXT ELEMENT 518

↓

QUERY THE CONTEXT STORE USING THE IDENTIFIER AND THE SEARCH VALUE 520

↓

RETRIEVE ONE OR MORE CONTEXT ITEMS FROM THE CONTEXT STORE, EACH CONTEXT ITEM COMPRISING A VALUE CORRESPONDING TO THE SEARCH VALUE 522

↓

PROVIDE THE ONE OR MORE CONTEXT ITEMS TO THE APPLICATION 524

↓

RETRIEVE ONE OR MORE DATA ITEMS FROM A DATA STORE, EACH DATA ITEM CORRESPONDING TO A REFERENCE VALUE STORED IN A RESPECTIVE CONTEXT ITEM OF THE RETRIEVED ONE OR MORE CONTEXT ITEMS 526

↓

PROVIDE THE ONE OR MORE DATA ITEMS TO THE APPLICATION 528

FIG. 5B

STORING CONTEXTUAL DATA WITH CONTEXT SCHEMAS

TECHNICAL FIELD

Aspects and embodiments of the present disclosure relate to data storage layers, and in particular to storing contextual data with context schemas.

BACKGROUND

Applications may provide services to users, systems, other applications, etc. Applications may use data storage layers to store and retrieve data related to the application's tasks and services. Examples of data storage layers that may be used include databases (e.g., relational, non-relational), key-value stores, file systems, files, etc.,

BRIEF DESCRIPTION OF DRAWINGS

Various embodiments in accordance with the present disclosure will be described with reference to the drawings, in which:

FIGS. 5A-B are flow diagrams of an example method for storing contextual data with context schemas, in accordance with an embodiment.

DETAILED DESCRIPTION

Figure 1:
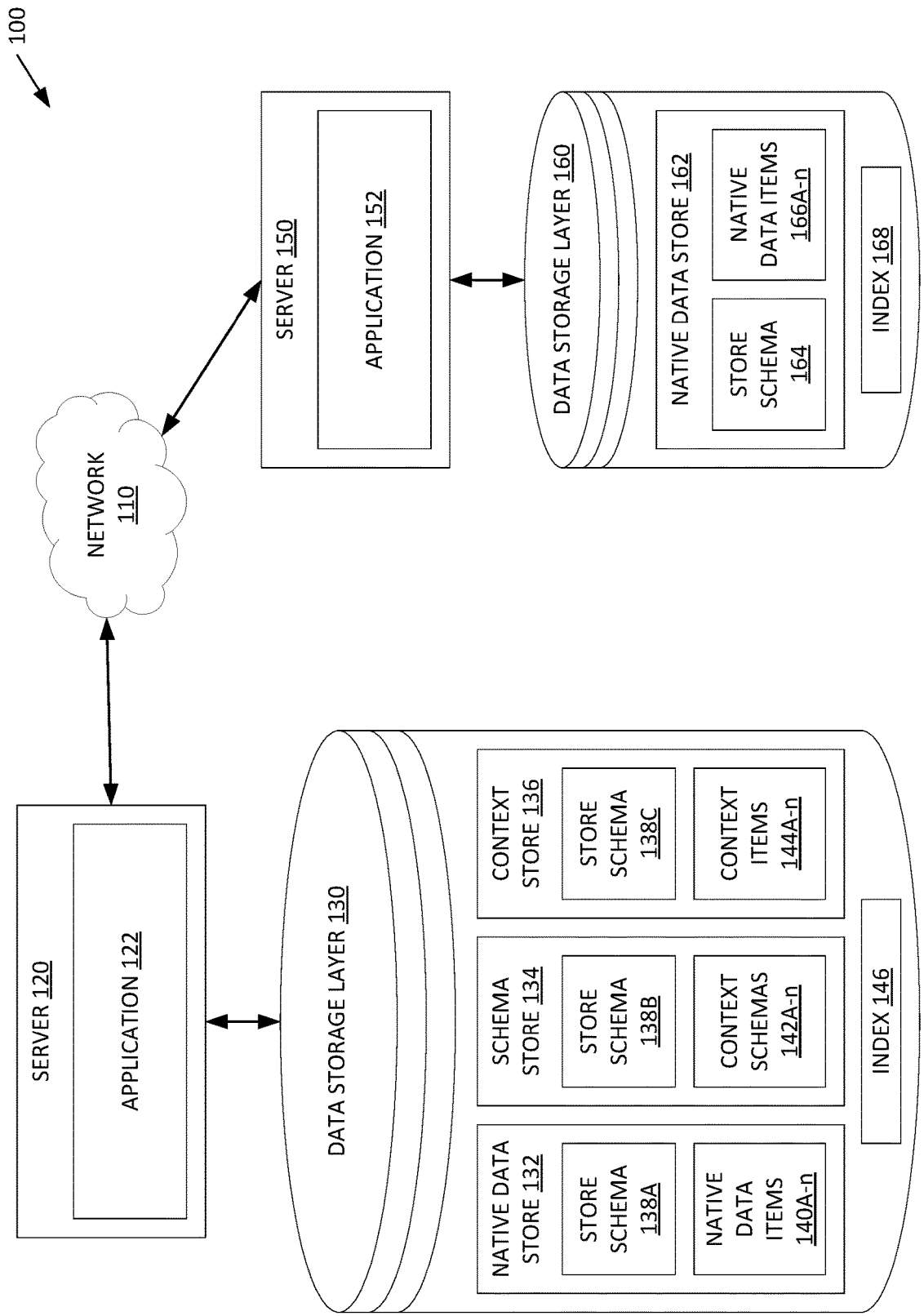
FIG. 1 is a block diagram of an example system architecture for storing contextual data with context schemas, in accordance with an embodiment.

Aspects of the present disclosure relate to storing contextual data with context schemas. Applications may provide services to users or other applications. Applications may use data storage layers to store and retrieve data related to the application's tasks and services. Examples of data storage layers that may be used include databases (e.g., relational, non-relational), key-value stores, file systems, files, etc. Context is a set of properties of a system or environment in which an application may operate. Examples of an application's context may include the requirements, constraints, and objectives of the application for which a data model is being designed. The context of an application influences the design of data storage layers so that the objectives of the application can be met. Examples of design decisions influenced by application context include a database type (e.g., relational or non-relational), and a database schema (e.g., structure of tables, columns, etc.).

Data storage solutions for an application may be designed and implemented before the application is deployed. For example, an application developer (e.g., a user, a team, an organization) may analyze the data to be stored, anticipated access frequencies and access activities (e.g., read-heavy or write-heavy), latency requirements, underlying technologies, costs, etc. to make design decisions related to the data storage solution. The application developer may select a data storage layer technology (e.g., a relational or non-relational database system) and may design a schema for the selected data storage layer technology. A schema is a configuration of a data storage layer based on the data to be stored. For example, a schema in a relational database may define tables, fields, columns, and other elements corresponding to data structures of the application. In a non-relational database, a schema may define requirements for documents, records, etc. Schemas may define other features for other types of data storage systems. The application developer may test the data storage layer and fine-tune the schema and other storage system parameters to meet the design goals and expected use cases prior to deploying the application to clients (e.g., users, other applications, etc.).

The above-described systems may face several challenges related to data storage layer design and schemas. It may be difficult, for example, to restructure a schema to accommodate new types of data or new relationships between data that were not captured in the schema during the initial design (e.g., prior to deploying the application). Restructuring a schema may involve, for example, temporarily taking an application offline, copying data (e.g., terabytes or exabytes of data) from an old database to a new database, fine-tuning a new schema, or other disruptive activities. Restructuring a schema may thus be prohibitively expensive in terms of cost, resource consumption, developer time, etc. Even for more flexible data storage layers that do not require as much effort to restructure (e.g., some non-relational or schema-less database systems), changing a schema after deployment may incur some efficiency losses (e.g., latency, resource consumption) and may still require some restructuring the application to accommodate the changes in the underlying data storage layer.

Furthermore, it may be difficult for such systems to store contextual data of clients using the data storage layers and schemas previously described. Systems may interact with many clients, each having their own data storage solutions and their own context. Systems or applications providing services to various clients may be referred to herein as host systems or host applications. Users, systems, applications, etc. interacting with the host application may be referred to herein as clients, client applications, etc. Each application may have its own native data modeled after its own context (e.g., host-side native data and client-side native data). Clients may want to store contextual data in a host system's data storage layer to create connections and references between host-side native data and client-side native data, which may aid in searching the host system's native data by the contextual data and aid in keeping native data updated in both host-side and client-side data storage layers, among other benefits. However, contextual data may be different for different clients, as each client may have its own type of native data, its own data storage layer technology and schema, etc. There may have been no collaboration between the host application developer and clients on the data models during design time (e.g., clients may be unknown to the host application developer at that time). Thus, it can be challenging to design a data storage layer schema prior to deployment that can accommodate a wide variety of contextual data after deployment. For example, a new client may be introduced after host application deployment, and the new client may have contextual data that wasn't foreseen during design of the host application data storage layer. The host-side and client-side data storage layers may thus be incompatible, and it may be difficult to share and query data between the data storage layers. This may necessitate a restructuring of the host-side data storage layer schema to accommodate the new client's contextual data in the above-described systems.

As a result of these and other challenges, application developers and clients may undertake costly solutions and workarounds to provide contextual data to a host application. As previously described, a solution may involve restructuring the host application data storage layer to accommodate the client's contextual data. Another solution may involve developing a translation layer or other additional application infrastructure to supplement the data shortcomings in the host data storage layer. These solutions may result in increased costs, downtime, and latency for data storage layers, increased developer time, and other inconveniences for application developers and clients.

Aspects of the present disclosure address the above and other deficiencies by storing contextual data in association with respective user-defined context schemas. In an embodiment, a context schema defines the structure of an application context, including identifiers of context items, their types, and their relationships. A context schema may be represented in a data structure (e.g., a document, a data type, etc.), which may be stored in a schema store of a host application along with other context schemas of other clients. A context schema may characterize contextual data of a client application, a client application's data storage layer, etc. with one or more context attributes. A context attribute may correspond to an element of native data of the client data storage layer (e.g., a column, field, etc.) and may provide various indications to the host application and its underlying data storage layer. For example, a context attribute may indicate whether a context element is required in a context item, should be searchable, etc. Context attributes may be used to generate and validate context items. A context item, generated by a client application for providing to a host application, may describe context for a native data item of the host application. The native data item of the host application may be generated, for example, as part of a transaction between the client and host during which the client provides the context item. The context item may include instances of context attributes of the corresponding context schema, which may correspond to values of a particular native data item of the client application. For example, a record or row in the client database (the values of which correspond to the columns, fields, or other elements indicated in the context attributes) may be included in the context item. A context item may similarly be represented in a data structure, which may be stored in a context store of the host application. As previously described with reference to other stores and storage layers, the context store may have its own schema (e.g., created at design time), which may enable uniform storage of context items from various clients. Thus, context items may conform to the schema of the context store as well as the corresponding context schema. Context schemas and context items may also conform to different versions of store schemas and context schemas, which may be indicated by version information stored in context schemas and context items.

Context schemas and context items may be received at the host application from one or more clients in addition to host-side native data items. The host application (or its data storage layer or other constituent component) may validate the context items against corresponding context schemas and may link the context items to native data items of the host application. Thus, a context item can provide a contextual correspondence between a native data item of the host application and a native data item of the client application, and the contextual correspondence may be stored at the host application in a context store for context items. The context items can then be used for various purposes on the host application side, such as for executing contextually informed searches of host application native data items based on a query received from the client application.

Accordingly, applications and data storage layers using the techniques described herein can provide storage of contextual data that enables applications to interact with clients having a variety of underlying data models and contexts without requiring restructuring of the application's underlying data model or other mitigations. Applications can further use the contextual data to provide enhanced services for clients, such as context-aware searching. Thus, application downtime and latency may be reduced, application developers may spend less time managing data storage layers to accommodate new clients, costs of operating applications and data storage layers may be reduced, and other benefits may accrue. The techniques described herein may further provide improved scalability, performance, and reliability for underlying data storage layers.

FIG. 1 is a block diagram of an example system architecture 100 for storing contextual data with context schemas, in accordance with an embodiment. System architecture 100 (also referred to as "system" herein) includes network 110, server 120, data storage layer 130, server 150, and data storage layer 160. In various embodiments, system 100 may include more or fewer components in different configurations than those depicted in FIG. 1. For example, system 100 may include additional servers and data storage layers in an embodiment.

Network 110 may include a public network (e.g., the Internet), a private network (e.g., a LAN, a WAN, a VPN, an enterprise network), a wired network (e.g., Ethernet), a wireless network (e.g., an 802.11 Wi-Fi network), a cellular network (e.g., a 5G network), routers, hubs, switches, server computers, or a combination thereof. Network 110 or components thereof may be associated with different organizations in various embodiments. For example, components of network 110 may be associated with Internet Service Providers (ISPs), mobile or cellular carriers, cloud platform or software-as-a-service (SaaS) providers, private or public enterprises, private households or communities, etc. In an embodiment, network 110 (or a component thereof) may be a physical or virtual interconnect within a single device, such as a PCIe bus, a messaging system, or an API.

Each of servers 120 and 150 may be a personal computer (PC), a laptop computer, a notebook computer, a mobile phone, a smartphone, a tablet computer, a digital assistant, a rackmount server, a router computer, or similar computing device. An example computing device is further described below with reference to FIG. 6. Servers 120 and 150 may also be a virtualized resource such as a virtual machine (VM) or a containerized application. Servers 120 and 150 may also correspond to a collection of physical or virtual computing resources, such as a datacenter or a collection of servers or VMs distributed across multiple data centers. For example, servers 120 and 150 may correspond to cloud computing resources provisioned from a cloud computing provider. Servers 120 and 150 may run an operating system or one or more software applications.

Servers 120 and 150 include applications 122 and 152, respectively. An application may be a hardware (e.g., circuitry, dedicated logic, etc.) or software (e.g., code, libraries, firmware, etc.) tool designed to fulfill various requirements and perform specific tasks. Applications may provide services to users (e.g., individuals or entities/organizations) or other applications. For example, an application on a user device may provide a graphical display of weather information or permit the user to browse the internet. In the same example, applications on servers may provide updated weather information to the user application or serve webpages to the user application for the user to browse. Furthermore, database applications may provide data (e.g., weather, webpages) to the server applications. Applications may communicate with users, other applications, other computing devices/resources, etc. using various communication media and protocols. For example, applications 122 and 152 may communicate with each other over network 110 using an API such as REST, SOAP, WebSockets, etc. In another example, applications 122 and 152 may communicate with data storage layers 130 and 160 using SQL, REST, etc.

Data storage layers 130 and 160 may be applications for receiving, storing, and providing data. Data storage layers 130 and 160 may be relational or non-relational databases, structured or unstructured databases, key-value stores, filesystems, or may conform to other data storage layer classifications. Data storage layers 130 and 160 may be backed by various persistent or non-persistent storage devices, such as RAM, magnetic tapes or drives, solid-state drives, optical drives, or similar (e.g., other storage technologies discussed below with reference to FIG. 6). Data storage layers 130 and 160 may also include storage devices in a networked topology, such as a Storage Area Network (SAN), Network-Attached Storage (NAS), cloud-provisioned storage, or similar. Data storage layers 130 and 160 may be provided by a respective server or servers (not depicted). In an embodiment, data storage layers 130 and 160 are provided by servers 120 and 150. Data storage layers 130 and 160 or their respective hardware may be centralized or decentralized. Examples of database applications that may correspond to data storage layers 130 and 160 include MongoDB, MySQL, MariaDB, DynamoDB, PostgreSQL, and others. Data storage layers 130 and 160 may partition data into various stores, buckets, tables, etc. based on the needs of the application(s) serviced by each data storage layer.

Data storage layer 130 includes native data store 132 for storing data conforming to a data model of application 122. As previously described, the data model of application 122 may correspond to the context of application 122, e.g., the requirements, constraints, etc. of application 122. The data model for native data store 132 may be represented by store schema 138A. For example, store schema 138A may correspond to a formal specification of elements of the data model (e.g., tables, fields, views, document formats, key-value formats, etc.) in a domain-specific language (e.g., SQL) used to initialize native data store 132 in accordance with the data model. In another example, store schema 138A may correspond to a set of rules to be followed by application 122 when writing to or reading from native data store 132 but may not be realized or enforced by the store itself (e.g., a schema-less database). Native data store 132 further includes native data items 140A-n, which may be written and read by application 122. Native data items 140A-n may correspond to a record, a row, a document, a key-value pair, or other entity within native data store 132. Native data items 140A-n may be generated and stored in accordance with the data model of application 122.

Data storage layer 160 includes native data store 162 for storing data related to application 152 of server 150, analogous to native data store 132 of data storage layer 130. Native data store 162 similarly includes store schema 164, which may correspond to a design of native data store 162 in view of the requirements, constraints, etc. of application 152. Native data store 162 similarly includes native data items 166A-n, which may be written and read by application 152. Native data stores 132 and 162 may correspond to the same or different types of data storage layers (e.g., relational, non-relational, etc.). Similarly, store schemas 138A and 164 and native data items 140A-n and 166A-n may be similar or different in view of similar or different design aspects of applications 122 and 152.

In one example, application 122 may be a contact-center-as-a-service application (also referred to herein as a contact center application or a host application) that supports live and automated chats and calls, customer services, and other related services. Application 122 may communicate with data storage layer 130 to store contact center-related data (e.g., native data) in native data store 132. Store schema 138A may specify elements (e.g., tables, fields, document attributes, etc.) related to the contact center application such as caller name and number, agent name and number, service ticket number (e.g., a unique identifier), etc. Each data item in native data items 140A-n may correspond to a single call/chat or to a chain of related communications. Clients of application 122 may be organizations or other entities that want to provide contact center services (e.g., live chat agent, customer service center, etc.) for their respective users. Clients of application 122 may have their own application—application 152—for managing support tickets created internally. For example, application 152 may track support tickets opened in-person at a retail store or through a form on the client's website. Application 152 may communicate with data storage layer 160 to store internal support ticket data in native data store 162. Store schema 164 may specify a different schema than store schema 138A. For example, store schema 164 may specify elements for support ticket number (e.g., a unique identifier), retail store location, IP address, etc. Clients of application 122 may want to transfer tickets from application 152 to application 122 or to link tickets of the respective applications together. Other clients of application 122 with yet other ticketing applications having different schemas may wish to link their internal tickets as well.

Returning to FIG. 1, data storage layer 130 further includes schema store 134 for storing context schemas characterizing a context of application 152 and data storage layer 160. A context of application 152 and data storage layer 160 may include data elements (e.g., data fields) and data items (e.g., records or entries) that are related to the properties of application 152 or to interactions between applications 122 and 152. Examples of a context may include unique identifiers, indices, searchable elements, etc. of data storage layer 160. An application may have multiple contexts, such as different contexts associated with different data storage layers, different aspects of the application, different tables or other data elements, etc. In the example described previously, a context of data storage layer 160 may include the support ticket number, retail store location, etc. A context schema may characterize the example contexts and other contexts as context attributes to provide awareness of the context at application 122 and data storage layer 130. Context items may include instances of the context attributes defined in a context schema (e.g., context values or metadata values). For example, a context schema may identify a unique identifier element of data storage layer 160 in a context attribute (e.g., the support ticket number element in the example), and a context item may identify a specific unique identifier value of a specific record of data storage layer 160 (e.g., a support ticket number of a specific support case in the example). Content of an example context schema is further described below with reference to FIG. 2. Content of an example context item is further described below with reference to FIG. 3.

Schema store 134 includes store schema 138B, which may correspond to a design of schema store 134 for storing context schemas of application 152/data storage layer 160 and other applications not depicted. Store schema 138B may define elements for this purpose as previously described with reference to other store schemas. Schema store 134 may store context schemas of application 152 and other applications as context schemas 142A-n (e.g., the context schemas may be stored as data items in schema store 134 rather than defining a design of schema store 134). For example, application 122 may receive a context schema from application 152 characterizing a context associated with application 152 and may proceed to store the context schema in schema store 134 as context schema 142A. Context schemas received from other applications (or from other components of the same application) may be stored as context schemas 142B-n.

Data storage layer 130 further includes context store 136 for storing context items of application 152 and data storage layer 160 (and other applications not depicted). Context store 136 includes store schema 138C, which may correspond to a design of context store 136 for storing context items of application 152/data storage layer 160 and other applications not depicted. Store schema 138C may define elements for this purpose as previously described with reference to other store schemas. Context store 136 may store context items of application 152 and other applications as context items 144A-n. For example, application 122 may receive a context schema from application 152 including metadata values and may proceed to store the context item in context store 136 as context item 144A. Context items received from the same or other application may be stored as context items 144B-n. In an embodiment, a context item may conform to both store schema 138C and a corresponding context schema of context schemas 142A-n. For example, store schema 138C may define elements for a unique context item identifier, a reference to the corresponding context schema, a reference to a corresponding native data item of native data items 140A-n, and a freeform or flexible element (e.g., a string or dictionary) for storing the metadata values. The corresponding context schema may further define the content of the freeform/flexible metadata values element. In an embodiment, store schema 138C may be one of context schemas 142A-n. For example, application 122 or data storage layer 130 may create a new context store 136 for each context schema received, and each new context store may be initialized according to a respective received context schema.

Data storage layers 130 and 160 further include indices 146 and 168, respectively, for facilitating indexing and searching of various elements and items of respective stores 132-136 and 162. A data storage layer index may provide more efficient (e.g., faster, fewer operations) search and retrieval of data items than may be achieved by searching every item in a data storage layer. For example, an index in a relational database may include a copy of or a reference to a column of a table, and various sorts, transformations, or functions may be used on or with the copied column to facilitate faster searching. Other types of data storage layers may have other types of indices or search optimizations. In various embodiments, index 146 may provide a single index for stores 132-136, or each store may be associated with their own indices (e.g., indices 146A-C, not depicted).

In various embodiments, applications 122 and 152 may be associated with various entities. For example, applications 122 and 152 may be associated with two different entities as in the example previously described (e.g., a contact center provider entity and a client entity of the contact center provider). Additional entities associated with additional applications 152 not depicted may communicate with application 122 as well. In another example, applications 122 and 152 may be associated with the same entity. In a variation of the previous example, the contact center provider entity may provide a different application—application 152—for a different service and may want to use the contact center application—application 122—to provide support for application 152. In the various examples, entities may be public or private organizations or enterprises, government agencies, individual users, automated systems and applications, etc.

In various embodiments, data storage layers 130 and 130 may include more or fewer components than depicted in FIG. 1. For example, one or more of stores 132-136 may be merged or absent (e.g., schema store 134 and context store 136 may be combined in an embodiment), or other stores not depicted may be present (e.g., additional native data stores may be present in either data storage layer). In another example, one or more of store schemas 138A-C and 164 may be absent (e.g., various stores may be schema-less stores).

In an embodiment, applications 122 or 152 may be hosted by devices other than servers 120 or 150. For example, application 152 may be hosted or served by a user device, an edge device, etc. In an embodiment, data storage layer 130 or data storage layer 160 may be absent, or the aspects of data storage layer 130 or data storage layer 160 described herein may be provided by another data storage technology. For example, application 152 may be provided by an edge device, which may not provide any local storage; data of the edge device may thus be stored solely as context at application 122/data storage layer 130. In another example, application 122 may store data described with reference to data storage layer 130 in a filesystem instead of a database application.

Figure 2:
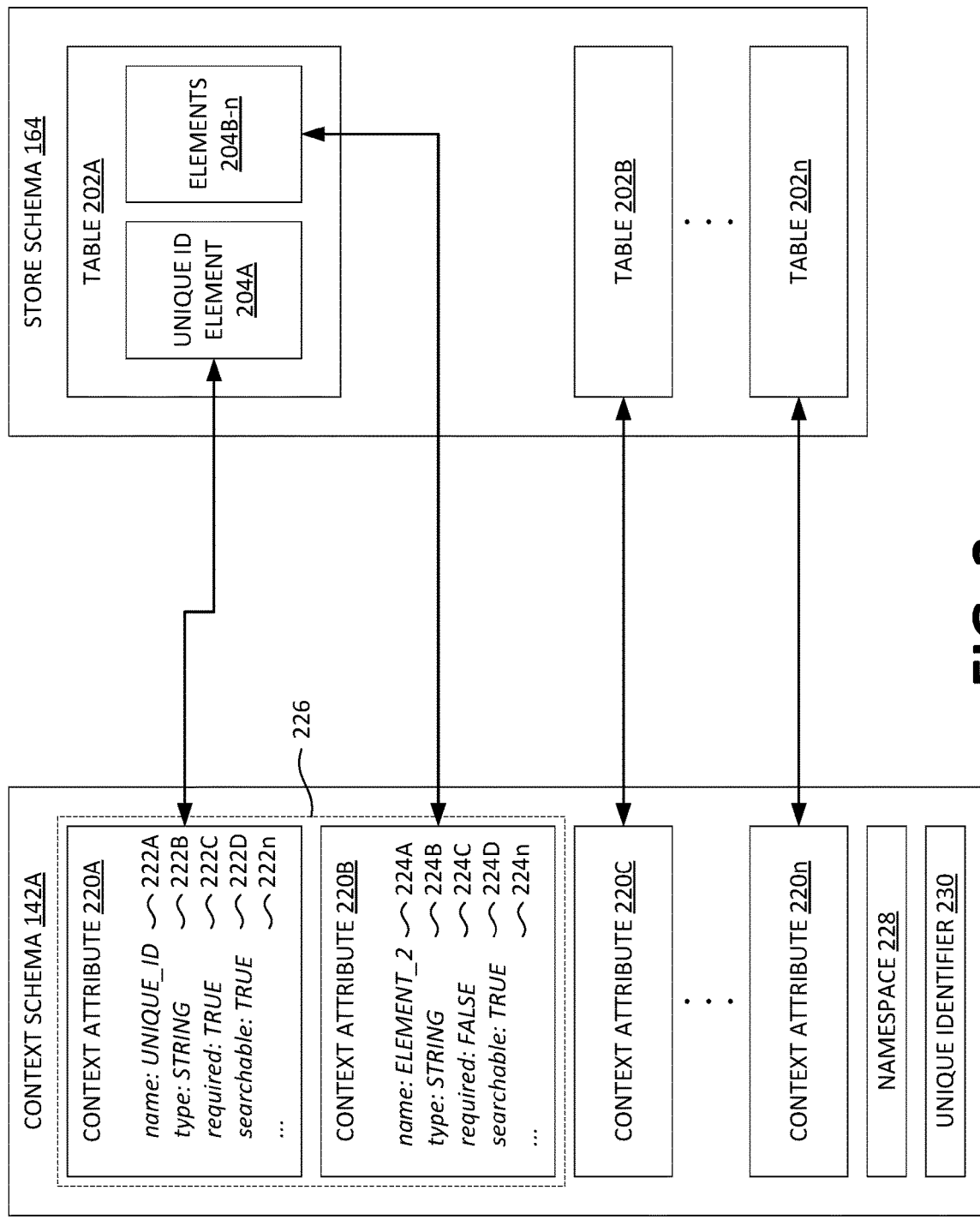
FIG. 2 is a block diagram of an example context schema in accordance with an embodiment.

FIG. 2 is a block diagram of an example context schema 142A in accordance with an embodiment. A context schema may be a data item such as a document, a software structure (e.g., a struct, an object, serialized versions of these), a message, etc. As described above with reference to FIG. 1, a context schema may characterize a context associated with a first application (e.g., application 152) to provide awareness of the context for a second application (e.g., application 122). For example, as depicted in FIG. 2, context schema 142A may characterize data of native data store 162 as defined by store schema 164. FIG. 2 depicts store schema 164 as including tables 202A-n each having various column elements (e.g., elements 204A-n in table 202A; other table details not depicted), however, as previously described, store schema 164 may correspond to other types of data storage layers not having tables and columns in various embodiments (e.g., non-relational databases). Other context schemas (e.g., context schemas 132B-n) may correspond to other stores within application 152/data storage layer 160 or other stores/databases associated with other applications in a manner similar to or analogous to the depiction of FIG. 2. Example column element 204A is depicted as a unique identifier element, however, unique identifier elements may or may not be present in some schemas.

Context schema 142A includes context attributes 220A-n. A context attribute may identify a type of contextual data of the first application to be provided to the second application in corresponding context items (e.g., context items described below with reference to FIG. 3). For example, a context attribute may correspond to an element of the first application such as a column element (e.g., context attributes 220A-B), a table element (e.g., context attributes 220C-n), a document or key-value category, etc. A context attribute may include one or more fields for this and other purposes, such as fields 222A-n and 224A-n in FIG. 2. One field (e.g., fields 222A and 224A) may be an identifier field that provides a name or other identifier of the corresponding element (e.g., elements 204A-B). Another field (e.g., fields 222B and 224B) may provide a datatype for the context attribute (e.g., string, integer, complex data type), which corresponding context items should adhere to. Another field (e.g., fields 222C and 224C) may indicate whether the context attribute is required or optional in corresponding context items. Another field (e.g., fields 222D and 224D) may indicate whether corresponding context items should be searchable by the context attribute within a context store (e.g., whether index 146 should be configured to facilitate searches of context store 136 by the context attribute). Other fields (e.g., fields 222n and 224n) having other purposes may be included in various embodiments, and one or more of the example fields 222A-D and 224A-D given herein may be omitted in various embodiments. Different context attributes may have the same or different numbers and types of fields in various embodiments. Each of fields 322A-n and 324A-n may be provided by the first application or the second in various embodiments.

Context attributes may be grouped in attribute groups, as depicted in FIG. 2 with context attributes 220A-B forming attribute group 226. Attribute groups may correspond to element groupings or other element relevancies in store schema 164. For example, attribute group 226 may include context attributes corresponding to column elements of table 202A, which column elements of other tables may form other attribute groups. Other organizations of context attributes may be provided in various embodiments, such as groups of attribute groups, etc.

Context schema 142A further includes namespace 228. Namespace 228 may be an identifier of context schema 142A, which may or may not be unique. For example, namespace 228 may identify context schema 142A with a particular application (e.g., application 152), with a particular entity (e.g., a client entity), with a group of applications, or similar. Context schema may include additional or fewer components for identification, classification, grouping, versioning, or for other purposes in various embodiments (e.g., unique identifier 230, a context schema version, a store schema version for a schema store, etc.). Identification-related components may be provided by applications 122 or 152. For example, namespace 228 may be provided by application 152, while unique identifier 230 may be provided by application 122 to distinguish context schema 142A from other context schemas in schema store 134.

Referring back to the previously described example, context schema 142A may characterize data context associated with the client's support ticket application to provide awareness of the context for the contact center application. Store schema 164 may define table 202A for storing support tickets, where element 204A is a support ticket number, element 204B is a retail store location, etc. Context schema 142A may define corresponding context attributes 220A for the support ticket number, 220B for the retail store location, etc. Context attribute 220A may be required because every support ticket has a support ticket number. However, context attribute 220B may be optional because not every support ticket was opened at a retail store (e.g., some may be opened on the website form previously mentioned). Both context attributes 220A-B may be searchable so that contact center staff can search for tickets by support ticket number or retail store location. Namespace 228 may be set by the contact center service provider to distinguish the client's support ticket application from other clients' support ticket applications (e.g., it may be set to a client ID number).

Figure 3:
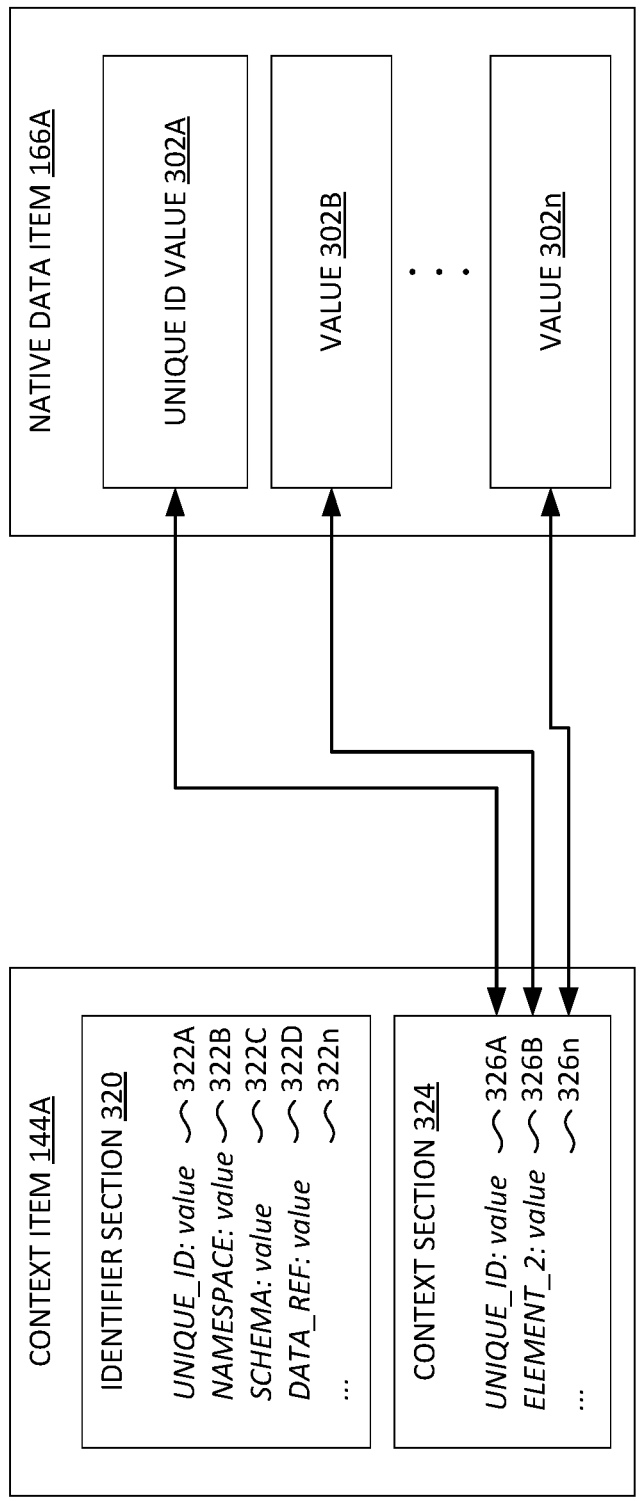
FIG. 3 is a block diagram of an example context item, in accordance with an embodiment.

FIG. 3 is a block diagram of an example context item 144A, in accordance with an embodiment. A context item may be a data item such as a document, a software structure (e.g., a struct, an object, serialized versions of these), a message, etc. As described above with reference to FIG. 1, a context item may include instances of context attributes (e.g., metadata values) of a first application defined in a context schema to be provided to a second application. For example, as depicted in FIG. 3, context item 144A may include instances of context attributes of context schema 142A corresponding to values of native data item 166A of native data store 162. FIG. 3 depicts native data item 166A as including values 302A-n, which may correspond to column values of a single record/row in a table, values in a document, values in a set of key-value pairs, etc. Example value 302A is depicted as a unique identifier value, however, unique identifier values may or may not be present in some data items.

Context item 144A includes identifier section 320, which may provide identifying information for context item 144A relative to various other data items, schemas, applications, entities, etc. Identifier section 320 includes example identifier fields 322A-n. One field (e.g., field 322A) may be a unique or non-unique identifier field that provides a name, number, or other identifier of the context item. Another field (e.g., field 322B) may be a namespace field that identifies a namespace to which context item 144A belongs. As previously described, a namespace may be associated with an application, an entity, etc. Another field (e.g., field 322C) may be a schema field that identifies a context schema (e.g., context schema 142A) to which the context item conforms. Another field (e.g., field 322D) may be a data reference field that identifies a native data item of the second application (e.g., native data item 140A of application 122) for which context item 144A provides context. Another field may be a context schema version or store schema version (for a context store). Other fields (e.g., field 322n) having other purposes may be included in various embodiments, and one or more of the example fields 322A-D given herein may be omitted in various embodiments. Different identifier sections of context items may have the same or different numbers and types of fields in various embodiments. Each of identifier fields 322A-n may be provided by the first application or the second in various embodiments.

Context item 144A further includes context section 324, which may provide metadata values for context item 144A. A metadata value may correspond to a context attribute of a context schema and a value of a native data item. For example, metadata value 326A corresponds to context attribute 220A (a unique identifier attribute) of context schema 142A and value 302A (a unique identifier value) of native data item 166. Metadata value 366B corresponds to context attribute 220B and value 302B, 326 corresponds to 220n and 302n, and so on. Each of metadata values 226A-n may be provided by the first application. In an embodiment, some of context attributes 220A-n may not have corresponding metadata values in a context item. For example, some context attributes may be marked as optional, or a context item may be associated with an attribute group (e.g., attribute group 226) that is a subset of context attributes 220A-n.

Referring back to the example previously described, context item 144A may correspond to a client's new support ticket that is to be transferred to the contact center application as a new service ticket. The value of field 322A may be the new support ticket number, the value of field 322B may be the client ID number (which may be added to the context item by application 122), and the value of field 322C may be a reference to context schema 142A (e.g., unique identifier 230). When transferring the new support ticket to the contact center application, the client application may include a native data item (of the contact center application) identifying the type of service to be provided (e.g., live chat, phone call) and other information. The native data item may be linked to context item 144A by field 322D.

Figure 4A:
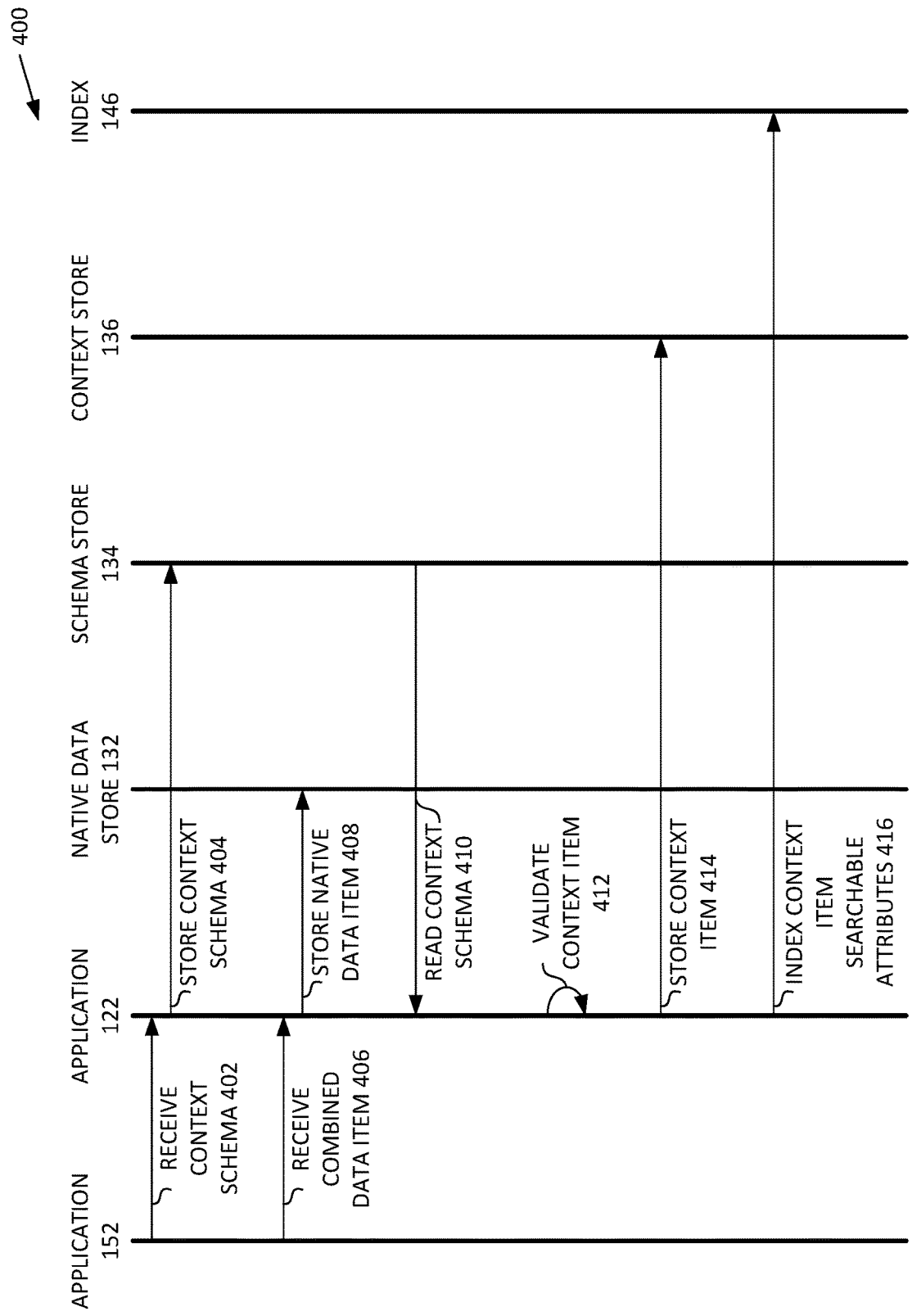
FIGS. 4A-B are sequence diagrams of an example interaction for storing contextual data with context schemas, in accordance with an embodiment.

FIG. 4A is a sequence diagram of an example interaction 400 between application 152, application 122, native data store 132, schema store 134, context store 136, and index 146 for storing contextual data with context schemas, in accordance with an embodiment. In some embodiments, operations depicted in FIG. 4A could occur in a different order or be performed by different components than depicted. Various embodiments may include additional operations or components not depicted in FIG. 4A or a subset of operations or components depicted in FIG. 4A. The operations depicted in FIG. 4A may correspond to different communication sessions or different timing intervals. For example, some operations may proceed in immediate succession or may be part of a single communication session, while other operations may be spread out over time or may be part of different communication sessions.

At operation 402, application 122 receives a context schema from application 152. The received context schema may characterize a context associated with application 152 to provide awareness and integration of the context (e.g., in the form of context items) at application 122. The received context schema may be context schema 142A described above with reference to FIG. 2, and may include identifying information (e.g., unique ID, namespace), context attributes, and other information. The received context schema may be received in a message, an API request (e.g., REST, SOAP, etc.), or similar. For example, application 152 may use an API of application 122 to send the context schema or vice versa. The received context schema may be represented in various formats and types of data items as previously described. For example, the received context schema may be represented in JSON, XML, or YAML markup formats. In an embodiment, the context schema may be received at application 122 as part of a configuration transaction between applications 152 and 122. For example, application 152 may be subscribing to a service of application 122 for the first time and may provide configuration values to customize aspects of application 122 to meet the needs of application 152. Application 122 may provide the context schema as a configuration value to facilitate exchange of contextual data in future transactions. In an embodiment, the context schema may be received as an update of an existing context schema (e.g., presently stored in schema store 134).

At operation 404, application 122 stores the received context schema in schema store 134. In an embodiment, storing the context schema may include validating the context schema prior to or simultaneously with storing the context schema. For example, schema store 134 includes store schema 138B, which may be created at design time of application 122 to enable uniform storage of context schemas from various client applications. The context schema may be validated against store schema 138B, such as by determining whether the context schema conforms to a required format, includes values for all required elements, etc. The context schema may be converted, translated, reorganized, etc. to be compatible with the store schema. In an embodiment, a transaction or communication with application 152 may be rejected or canceled if the context schema is determined to be invalid. In an embodiment, storing the context schema may include creating or updating an index of one or more of stores 132-136 (e.g., index 146) based on the context schema (e.g., based on context attributes of the context schema indicated as searchable context attributes). In an embodiment, the received context schema may be stored in a location or storage medium other than schema store 134. For example, the context schema may be stored in RAM of server 120, in another data store (e.g., native data store 132 or context store 136), in a key-value service, or similar.

At operation 406, application 122 receives a combined data item from application 152. The combined data item may include a native data item and a context item. As previously described, the native data item may include data values related to services or functionality provided by application 122. For example, the native data item may include arguments of API function calls of application 122, message contents required by application 122, or similar. The context item may include data values related to the received native data item. For example, the context item may include metadata values to associate a native data item(s) of application 152 with the received native data item of application 122. The received context item may be context item 144A described above with reference to FIG. 3, and may include identifying information (e.g., identifier section 320), metadata values (e.g., context section 324), and other information. In various embodiments, the received combined data item may include one of either the native data item or the context item, or the native data item and the context item may be received in separate communications or transactions. In an embodiment, the received native data item or the received context item may reference each other, e.g., using a data reference value (e.g., a value of field 322D of FIG. 3).

At operation 408, application 122 stores the received native data item in native data store 132. In an embodiment, storing the native data item may include validating the native data item prior to or simultaneously with storing the native data item. For example, the native data item may be validated against a store schema of native data store 132 (e.g., store schema 138A), or the native data item may be converted, translated, reorganized, etc. to be compatible with the store schema (e.g., API function arguments may be converted into a record and inserted into a database table). In an embodiment, a transaction or communication with application 152 may be rejected or canceled if the native data item is determined to be invalid. In an embodiment, storing the native data item may include modifying the native data item. For example, the native data item may be modified to include a reference to the received context item. In an embodiment, the received native data item may be stored in another location or storage medium as described with reference to operation 404.

At operation 410, application 122 reads the context schema received at operation 402 from schema store 134. For example, application 122 may read the context schema from schema store 134 into RAM for further processing described below. In an embodiment, operation 410 may be absent. For example, the received context schema may have been stored in RAM at operation 404, and thus reading the context schema back into RAM at operation 410 may be unnecessary. In an embodiment, multiple context schemas may be stored at schema store 134, and application 122 may determine which context schema to read based on a namespace or other identifier indicated in the received context item.

At operation 412, application 122 validates the received context item against the context schema. Validating the context item may include determining whether every metadata value of the context item corresponds to a context attribute of the context schema. Validating the context item may further include determining whether every required context attribute of the context schema (e.g., as indicated by example fields 222C and 224C of FIG. 2) corresponds to a metadata value of the context item. In an embodiment, a transaction or communication with application 152 may be rejected or canceled if the context item is determined to be invalid against the context schema.

At operation 414, application 152 stores the received context item in context store 136. In an embodiment, storing the context item may include additional validation of the context item prior to or simultaneously with storing the context item. For example, the context item may be validated against a store schema of context store 136 (e.g., store schema 138C), or the context item may be modified, converted, translated, reorganized, etc. to be compatible with the store schema (e.g., a unique identifier such as a value for field 322A may be added before storing). In an embodiment, a transaction or communication with application 152 may be rejected or canceled if the context item is determined to be invalid against the store schema. In an embodiment, storing the context item may include modifying the context item. For example, the context item may be modified to include a reference to the received native data item. In an embodiment, the received context item may be stored in another location or storage medium as described with reference to operations 404 and 408.

At operation 416, application 122 indexes searchable attributes of the context item. For example, application 122 may create or update an index of one or more of stores 132-136 (e.g., index 146) based on metadata values of the context item corresponding to searchable context attributes of the context schema. In an embodiment, indexing of searchable attributes of the context item may be part of operations 412 or 414. Operation 416 may be absent for context items or context schemas not including searchable context attributes or values (e.g., a searchable attribute may also be an optional attribute, and context items not including a corresponding value may not be indexed on that attribute/value).

In an embodiment, as previously described, example interaction 400 may include additional applications 152 in communication with application 122. The additional applications may each provide one or more context schemas (e.g., as in operation 402) and may further provide one or more context items (and associated native data items, if applicable) for each provided context schema (e.g., as in operation 406). Application 122 may store the received context schemas, native data items, or context items in shared stores holding data items from all applications or in dedicated stores for each application (or subsets of applications). Application 122 may add identifying information (e.g., namespaces, unique identifiers) to received context schemas, native data items, or context items to distinguish the originating application for each item.

Figure 4B:
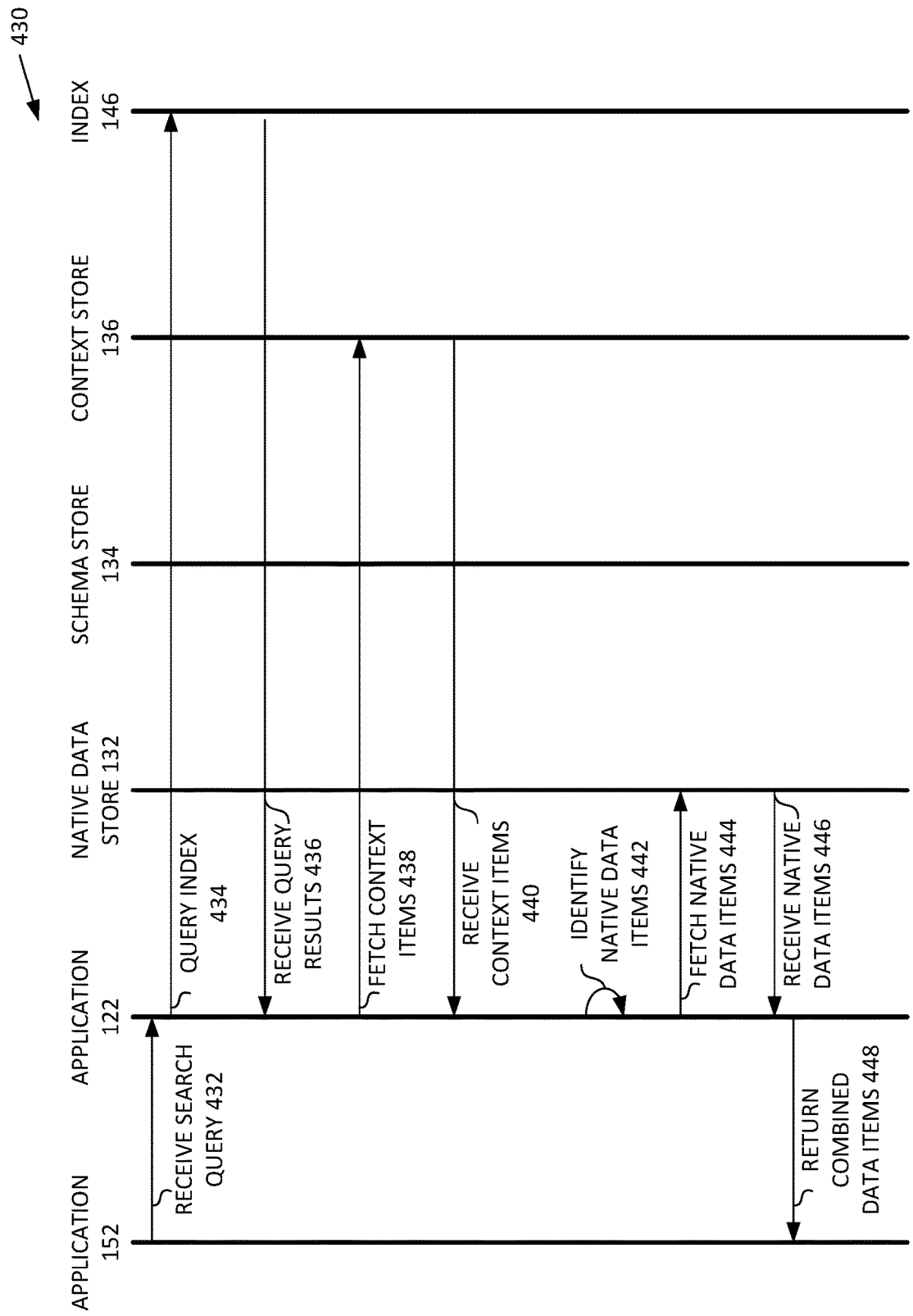

FIG. 4B is a sequence diagram of an example interaction 430 between application 152, application 122, native data store 132, schema store 134, context store 136, and index 146 for storing contextual data with context schemas, in accordance with an embodiment. In some embodiments, operations depicted in FIG. 4B could occur in a different order or be performed by different components than depicted. Various embodiments may include additional operations or components not depicted in FIG. 4B or a subset of operations or components depicted in FIG. 4B. The operations depicted in FIG. 4B may correspond to different communication sessions or different timing intervals. For example, some operations may proceed in immediate succession or may be part of a single communication session, while other operations may be spread out over time or may be part of different communication sessions.

At operation 432, application 122 receives a search query from application 152. The search query may be based on context previously provided by application 152 to application 122. For example, the search query may correspond to searchable context attributes indicated in a previously received context schema or indexed metadata values of a previously received context item. In an embodiment, the search query may be implicit in another communication or transaction between application 152 and 122 (e.g., in another communication directed to particular context, which may induce application 122 to initiate a search for that context). The search query may include additional information, such as a namespace related to application 152, the type of data to be returned, an action to be performed with the query results, etc.

At operation 434, application 122 queries index 146 based on the received search query. The index query may further be based on one or more previously indexed context attributes (e.g., operation 416 of FIG. 4A). Querying the index at operation 434 may include translating or modifying the search query received at operation 432 to generate another search query. For example, application 122 may receive a search query from application 152 via an API (e.g., REST) and may generate another search query for the index in a domain-specific representation (e.g., as a SQL query) using the received query.

At operation 436, application 122 receives query results from index 246. In an embodiment, the query results may indicate unique identifiers of or references to one or more context items in context store 136. Then at operation 438, application 122 fetches context items from context store 136 based on the query results (e.g., based on the unique identifiers of the context items or references to the context items in context store 136). At operation 440, application 122 receives the context items from context store 136. In an embodiment, the query results at operation 436 may be the context items in context store 136 (e.g., the index may return the context items directly). Thus, operations 438 and 440 may be absent.

At operation 442, application 122 identifies native data items associated with the received context items. For example, the received context items may each include a unique identifier of or a reference to one or more respective native data items (e.g., native data items received in the compound data item at operation 406). In another example, application 122 may query index 146 for native data items identifying/referencing the received context items and receive results (not depicted). Application 122 may receive identifiers of or references to native data items matching the search criteria (not depicted). In both examples, application 122 fetches native data items from native data store 132 at operation 444 using the identifier/reference. Application 122 then receives the native data items from native data store 132 at operation 446. In an embodiment, the native data items may be received during another operation, and thus operations 444 and 446 may be absent. For example, native data items may be returned by the index with the query results at operations 436 or at the example query of operation 442 previously described (not depicted).

At operation 448, application 122 returns one or more combined data items to application 152. Each combined data item may include a context item matching the original search query of operation 432 and one or more native data items associated with the included context item. Prior to returning the combined data items, application 122 may translate or modify the context items or native data items and generate the combined data items. For example, data items may be modified to match a format expected by application 152 or to remove fields such as identifiers/references linking the context items and native data items. In an embodiment, the context items and respective native data items may be returned separately rather than combined. In an embodiment, context items may be returned and native data items may not be returned. In an embodiment, native data items may be returned and context items may not be returned.

Figure 5A:
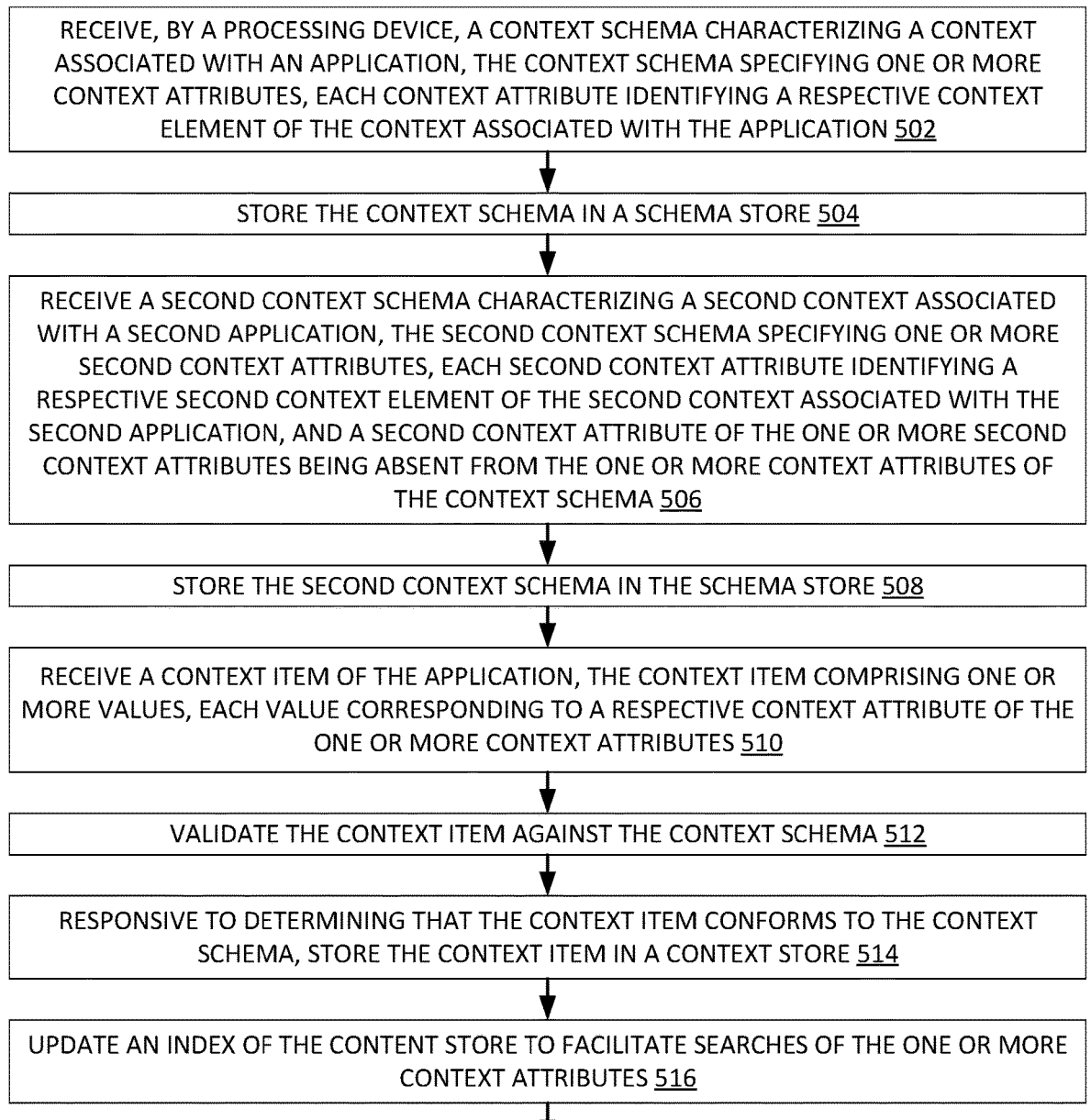

FIGS. 5A-B are flow diagrams of an example method 500 for storing contextual data with context schemas, in accordance with an embodiment. Method 500 may be performed by processing logic that may comprise hardware (e.g., circuitry, dedicated logic, etc.), computer-readable instructions such as software or firmware (e.g., run on a general-purpose computing system or a dedicated machine), or a combination thereof. For instance, an example system may include a memory and a processing device coupled to the memory device to perform operations comprising the blocks of method 500. Method 500 may also be associated with a set of instructions stored on a non-transitory computer-readable medium (e.g., magnetic or optical disk, etc.). The instructions, when executed by a processing device, may cause the processing device to perform operations comprising the blocks of method 500. In an embodiment, method 500 is performed by server 120, application 122, or data storage layer 130 of FIG. 1. In an embodiment, method 500 is performed by computing system 600 of FIG. 6. In some embodiments, blocks depicted in FIGS. 5A-B could be performed simultaneously or in a different order than depicted. Various embodiments may include additional blocks not depicted in FIGS. 5A-B or a subset of blocks depicted in FIGS. 5A-B.

At block 502, processing logic receives a context schema characterizing a context associated with an application, the context schema specifying one or more context attributes, each context attribute identifying a respective context element of the context associated with the application. For example, the application may be application 152, and the context of the application may be associated with native data store 162 and native data items 166A-n of data storage layer 160. The received context schema may be context schema 142A, and the one or more context attributes may be context attributes 220A-n. Field 222A of context attribute 220A identifies a context element—a unique ID column—stored in native data store 162 of application 152. At block 504, processing logic stores the context schema in a schema store. The schema store may be schema store 134, for example. The context schema may be stored as data and may conform to a store schema of the schema store (e.g., store schema 138B) as described with reference to operation 404. The context schema may further conform to a specific version (e.g., version number) of the store schema of the schema store, which may be indicated in a field of the context schema. Storing the context schema at block 504 may include verifying that the context schema version matches the store schema version.

At block 506, processing logic receives a second context schema characterizing a second context associated with a second application (e.g., a second application 152 or other client application), the second context schema specifying one or more second context attributes, each second context attribute identifying a respective second context element of the second context associated with the second application. The second application may be similar to or different from the application of block 502. For example, the second application may have a different store schema 164 for its native data store 162, including different tables, columns, etc. Similarly, the second context schema may have different context attributes than the context schema of block 502. For example, a second context attribute of the one or more second context attributes may be absent from the one or more context attributes of the context schema received at block 502. At block 508, processing logic stores the second context schema in the schema store as described with reference to block 504. In an embodiment, the application and the second application may be the same application, and the first second context schemas may characterize different contexts of the same application.

At block 510, processing logic receives a context item of the context associated with the application, the context item comprising one or more values, each value corresponding to a respective context attribute of the one or more context attributes. For example, the context item may be context item 144A and may include a context section with metadata values corresponding to the context attributes of context schema 142A. The context item may correspond to a data item associated with the application, such as native data item 166A. The metadata values of the context section may correspond to values of the data item. The context item may include other information, such as the example fields and values 322A-n in identifier section 320 of context item 144A.

In an embodiment, receiving the context item further comprises receiving a data item associated with a second application (e.g., application 122 or other host application), storing the data item associated with the second application in a data store, and adding an identifier of the stored data item associated with the second application to the context item. The data item associated with the second application may be received as part of a combined data item comprising the context item and the data item. The data item may be native to the second application and may conform to a schema of the data store (e.g., native data item 140A of native data store 132 conforms to store schema 138A). The one or more values of the context item may provide context for the data item associated with the second application by linking it to the data item associated with the application as previously described (e.g., native data item 166A). This contextual correspondence between the data items of the application and the second application may enable context-aware searching and provide other benefits as previously described. The identifier of the stored data item associated with the second application, which may be a unique or non-unique identifier in various embodiments, may be added to the context item to link it with the data item for which it provides context (e.g., the value of field 322A).

In an embodiment, a context attribute of the one or more context attributes is associated with an identifier element (e.g., unique or non-unique) stored in a data storage layer of the application, and a value of the one or more values of the context item corresponds to an identifier value (e.g., unique or non-unique) of an item stored in the data storage layer of the application. For example, the data storage layer of the application may be data storage layer 160 or native data store 162, and the identifier element may be unique identifier element 204A. The item may be a native data item of the application (e.g., native data item 166A), which may be associated with a unique identifier value (e.g., value 302A).

At block 512, the processing logic validates the context item against the context schema. For example, the processing logic may determine whether all required attributes of the context schema have a corresponding metadata value in the context item and whether all metadata values in the context item correspond to a context attribute of the context schema. Other validation operations may be performed (e.g., ensuring the metadata values are the right data type, conform to a format, are within a certain range, etc.). In an embodiment, prior to validating the context item against the context schema, the processing logic may first identify the context schema and retrieve the context schema from the schema store. For example, the processing logic may use a namespace or other identifier in the context item to determine the relevant context schema. The processing logic may also use an identifier of the application from which the context item was received (e.g., a key, hostname, IP address, etc.).

At block 514, responsive to determining that the context item conforms to the context schema, the processing logic stores the context item in a context store. The context store may be context store 136, for example. The context item may conform to both the context schema and a store schema of the context store (e.g., store schema 138C). In an embodiment, the context item may be modified prior to storing as previously described. The context item may further conform to specific versions (e.g., version numbers) of the context schema or store schema of the context store, which may be indicated in a field of the context item. Validation operations performed at blocks 512 or 514 may include verifying that the context item version matches the context schema or store schema versions.

At block 516, the processing logic updates an index of the context store to facilitate searches of the one or more context attributes. For example, the index may be index 146, and the index may be updated based on context attributes indicated as searchable attributes (e.g., by field 222D). Index 146 may be updated to include a subset of context items (e.g., a view in a relational database table), a searchable collection of references to the context items, or similar.

At block 518, the processing logic receives a search query from the application, the search query comprising an identifier of a context attribute and a search value of the respective context element. At block 520, the processing logic queries the context store using the identifier and the search value. The identifier of the context attribute may be a unique identifier of the context schema to which the context attribute belongs, and name of the context attribute or corresponding context element, or other identifier. The search value may be an allowed value of the context attribute that may be present in one or more context objects (e.g., a value matching type or formatting requirements specified in the context attribute).

At block 522, the processing logic retrieves one or more context items from the context store, each context item comprising a value corresponding to the search value. At block 524, the processing logic provides the one or more context items to the application. In an embodiment, the processing logic may modify the context items before providing them to the application as previously described.

At block 526, the processing logic retrieves one or more data items (e.g., native data items) each corresponding to a reference value stored in a respective result context item of the retrieved one or more context items. At block 528, the processing logic provides the one or more data items to the application. In an embodiment, the retrieved context items and the retrieved data items may be provided together as one or more result combined data items.

Figure 6:
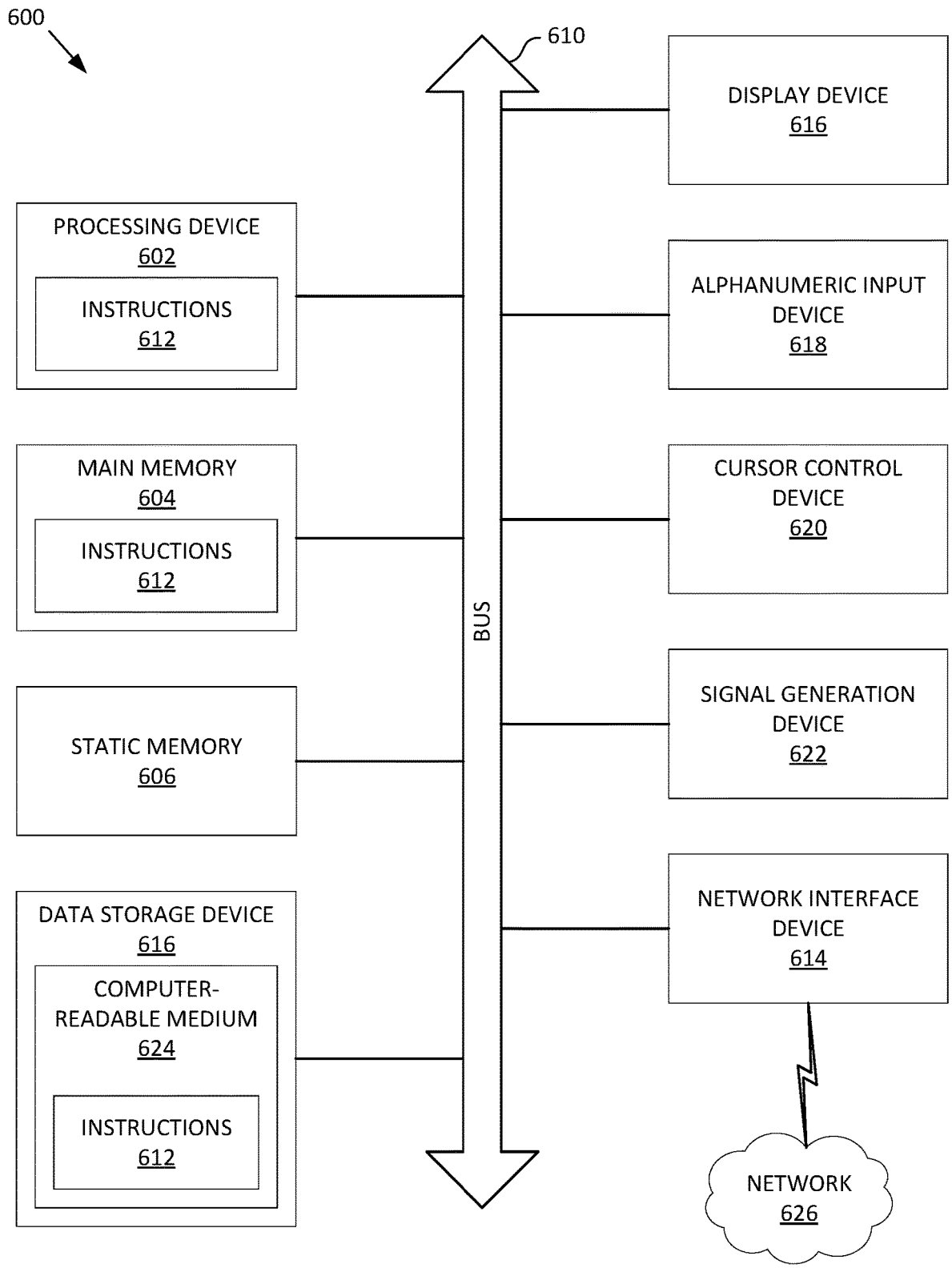
FIG. 6 illustrates an example computer system, in accordance with an embodiment.

FIG. 6 is a block diagram illustrating an example computer system 600, in accordance with implementations of the present disclosure. Computer system 600 may correspond to servers 120 or 150, applications 122 or 152, or data storage layers 130 or 160, as described above with reference to FIG. 1. Computer system 600 may operate in the capacity of a server or an endpoint machine in endpoint-server network environment, or as a peer machine in a peer-to-peer (or distributed) network environment. The machine may be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 600 includes processing device 602 (e.g., one or more processors or cores), main memory 604 (e.g., read-only memory (ROM), flash memory, dynamic random access memory (DRAM) such as synchronous DRAM (SDRAM), double data rate (DDR SDRAM), or DRAM (RDRAM), etc.), static memory 606 (e.g., flash memory, static random access memory (SRAM), etc.), and data storage device 608, which communicate with each other via bus 610.

Processing device 602 represents one or more general-purpose processing devices such as a microprocessor, central processing unit, or the like. More particularly, processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute instructions 612 (e.g., for storing contextual data with context schemas) for performing the operations discussed herein.

Computer system 600 may further include network interface device 614. Computer system 600 also may include display device 616 (e.g., a liquid crystal display (LCD) or a cathode ray tube (CRT)), alphanumeric input device 618 (e.g., a keyboard, and alphanumeric keyboard, a motion sensing input device, touch screen), cursor control device 620 (e.g., a mouse), and signal generation device 622 (e.g., a speaker). In some embodiments, computer system 600 may not include display device 616, alphanumeric input device 618, and/or cursor control device 620 (e.g., in a headless configuration).

Data storage device 608 may include a non-transitory machine-readable storage medium 624 (also computer-readable storage medium) on which is stored one or more sets of instructions 612 (e.g., for storing contextual data with context schemas) embodying any one or more of the methodologies or functions described herein. Instructions 612 may also reside, completely or at least partially, within main memory 604 or within the processing device 602 during execution thereof by computer system 600, main memory 604 and processing device 602 also constituting machine-readable storage media. Instructions 612 may further be transmitted or received over network 626 via network interface device 614.

In one implementation, instructions 612 include instructions for storing contextual data with context schemas, as described herein. While computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above-described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:
   receiving, by a host application, a context schema of a first client application of a plurality of client applications, the context schema characterizing a context associated with the first client application, the context schema of the first client application being received from the first client application via an application programming interface (API), the context schema of the first client application specifying one or more context attributes, each context attribute identifying a respective context element of the context associated with the first client application;
   storing, by the host application, the context schema of the first client application in a schema store, wherein the schema store also stores contexts of other client applications of the plurality of client applications;
   receiving, by the host application from the first client application, a first context item of the context associated with the first client application, the first context item comprising one or more values, each value corresponding to a respective context attribute of the one or more context attributes;
   validating, by the host application, the first context item against the context schema of the first client application; and
   responsive to determining that the first context item conforms to the context schema of the first client application, storing, by the host application, the first context item in a context store, wherein the context store also stores context items of contexts associated with the other client applications.

2. The method of claim 1, further comprising:
   receiving a second context schema characterizing a second context associated with a second client application, the second context schema specifying one or more second context attributes, each second context attribute identifying a respective second context element of the second context associated with the second client application, and a second context attribute of the one or more second context attributes being absent from the one or more context attributes of the context schema of the first client application.

3. The method of claim 1, wherein receiving the first context item of the context associated with the first client application comprises:
   receiving a data item associated with a second client application, wherein the one or more values of the first context item provide context for the data item associated with the second client application;
   storing the data item associated with the second client application in a data store; and
   adding an identifier of the stored data item associated with the second client application to the first context item.

4. The method of claim 1, wherein a context attribute of the one or more context attributes is associated with an identifier element stored in a data storage layer of the first client application, and wherein a value of the one or more values of the first context item corresponds to an identifier value of an item stored in the data storage layer of the first client application.

5. The method of claim 1, further comprising:
   updating an index of the context store to facilitate searches of the one or more context attributes.

6. The method of claim 1, further comprising:
   receiving a search query from the first client application, the search query comprising an identifier of a context attribute and a search value of the respective context element;
   retrieving one or more context items from the context store, each context item comprising a value corresponding to the search value; and
   providing the one or more context items to the first client application.

7. The method of claim 6, further comprising:
   retrieving one or more data items from a data store, each data item corresponding to a reference value stored in a respective context item of the retrieved one or more context items; and
   providing the one or more data items to the first client application.

8. A system comprising:
   a memory device; and
   a processing device coupled to the memory device, the processing device to perform operations comprising:
      receiving, using a host application, a context schema of a first client application of a plurality of client applications, the context schema characterizing a context associated with the first client application, the context schema of the first client application being received from the first client application via an application programming interface (API), the context schema of the first client application specifying one or more context attributes, each context attribute identifying a respective context element of the context associated with the first client application;
      storing, using the host application, the context schema of the first client application in a schema store, wherein the schema store also stores contexts of other client applications of the plurality of client applications;
      receiving, using the host application from the first client application, a first context item of the context associated with the first client application, the first context item comprising one or more values, each value corresponding to a respective context attribute of the one or more context attributes;
      validating, using the host application, the first context item against the context schema of the first client application; and
      responsive to determining that the first context item conforms to the context schema of the first client application, storing, using the host application, the first context item in a context store, wherein the context store also stores context items of contexts associated with the other client applications.

9. The system of claim 8, the operations further comprising:
   receiving a second context schema characterizing a second context associated with a second client application, the second context schema specifying one or more second context attributes, each second context attribute identifying a respective second context element of the second context associated with the second client application, and a second context attribute of the one or more second context attributes being absent from the one or more context attributes of the context schema of the first client application.

10. The system of claim 8, wherein receiving the first context item of the context associated with the first client application comprises:
receiving a data item associated with a second client application, wherein the one or more values of the first context item provide context for the data item associated with the second client application;
storing the data item associated with the second client application in a data store; and
adding an identifier of the stored data item associated with the second client application to the first context item.

11. The system of claim 8, wherein a context attribute of the one or more context attributes is associated with an identifier element stored in a data storage layer of the first client application, and wherein a value of the one or more values of the first context item corresponds to an identifier value of an item stored in the data storage layer of the first client application.

12. The system of claim 8, the operations further comprising:
updating an index of the context store to facilitate searches of the one or more context attributes.

13. The system of claim 8, the operations further comprising:
receiving a search query from the first client application, the search query comprising an identifier of a context attribute and a search value of the respective context element;
retrieving one or more context items from the context store, each context item comprising a value corresponding to the search value; and
providing the one or more context items to the first client application.

14. The system of claim 13, the operations further comprising:
retrieving one or more data items from a data store, each data item corresponding to a reference value stored in a respective context item of the retrieved one or more context items; and
providing the one or more data items to the first client application.

15. A non-transitory computer-readable medium comprising instructions that, when executed by a processing device, cause the processing device to perform operations comprising:
receiving, using a host application, a context schema of a first client application of a plurality of client applications, the context schema characterizing a context associated with the first client application, the context schema of the first client application being received from the first client application via an application programming interface (API), the context schema of the first client application specifying one or more context attributes, each context attribute identifying a respective context element of the context associated with the first client application;
storing, using the host application, the context schema of the first client application in a schema store, wherein the schema store also stores contexts of other client applications of the plurality of client applications;
receiving, using the host application from the first client application, a first context item of the context associated with the first client application, the first context item comprising one or more values, each value corresponding to a respective context attribute of the one or more context attributes;
validating, using the host application, the first context item against the context schema of the first client application; and
responsive to determining that the first context item conforms to the context schema of the first client application, storing, using the host application, the first context item in a context store, wherein the context store also stores context items of contexts associated with the other client applications.

16. The non-transitory computer-readable medium of claim 15, the operations further comprising:
receiving a second context schema characterizing a second context associated with a second client application, the second context schema specifying one or more second context attributes, each second context attribute identifying a respective second context element of the second context associated with the second client application, and a second context attribute of the one or more second context attributes being absent from the one or more context attributes of the context schema of the first client application.

17. The non-transitory computer-readable medium of claim 15, wherein receiving the first context item of the context associated with the first client application comprises:
receiving a data item associated with a second client application, wherein the one or more values of the first context item provide context for the data item associated with the second client application;
storing the data item associated with the second client application in a data store; and
adding an identifier of the stored data item associated with the second client application to the first context item.

18. The non-transitory computer-readable medium of claim 15, wherein a context attribute of the one or more context attributes is associated with an identifier element stored in a data storage layer of the first client application, and wherein a value of the one or more values of the first context item corresponds to an identifier value of an item stored in the data storage layer of the first client application.

19. The non-transitory computer-readable medium of claim 15, the operations further comprising:
updating an index of the context store to facilitate searches of the one or more context attributes.

20. The non-transitory computer-readable medium of claim 15, the operations further comprising:
receiving a search query from the first client application, the search query comprising an identifier of a context attribute and a search value of the respective context element;
retrieving one or more context items from the context store, each context item comprising a value corresponding to the search value; and
providing the one or more context items to the first client application.

* * * * *